United States Patent [19]

Sonntag

[11] Patent Number: 5,377,231
[45] Date of Patent: Dec. 27, 1994

[54] AUTOMATIC GAIN CONTROL CIRCUIT FOR A DIGITAL BASEBAND LINE EQUALIZER

[75] Inventor: Jeffrey L. Sonntag, Fleetwood, Pa.

[73] Assignee: AT&T Corp., Murray Hill, N.J.

[21] Appl. No.: 159,402

[22] Filed: Nov. 30, 1993

[51] Int. Cl.$^5$ ............................................. H04L 27/08
[52] U.S. Cl. .................................. 375/98; 455/234.1; 455/245.1
[58] Field of Search ........................ 375/11–12, 375/76, 98; 455/234.1, 239.1, 245.1; 330/278–279; 307/358, 360, 362; 348/685

[56] References Cited

U.S. PATENT DOCUMENTS

| | | | |
|---|---|---|---|
| 3,898,380 | 8/1975 | Wilcox | 375/98 |
| 4,204,172 | 5/1980 | Sadom et al. | 455/234.1 |
| 5,124,980 | 6/1992 | Maki | 375/98 |
| 5,243,625 | 9/1993 | Verbakel et al. | 375/98 |

Primary Examiner—Stephen Chin
Assistant Examiner—Young Tse

[57] ABSTRACT

An automatic gain control circuit produces a control voltage for a digital baseband line equalizer having a ternary output signal. The circuit includes a capacitor for storing a charge to produce the control voltage, a charge circuit for charging the capacitor if the amplitude of the ternary output signal exceeds a reference voltage, and a discharging circuit for discharging the capacitor only when the ternary output signal is at a non-zero level.

13 Claims, 2 Drawing Sheets

AUTOMATIC GAIN CONTROL CIRCUIT FOR A DIGITAL BASEBAND LINE EQUALIZER

BACKGROUND OF THE INVENTION

1. Field of the Invention

The invention relates to repeaters used in digital telephone communications, and more particularly, to an automatic gain control circuit for a digital baseband line equalizer such as that found in a T1 or an E1 repeater.

2. Related Art

In telephony, T1 and E1 are digital transmission standards. T1 is a standard used in the United States. A similar standard used in Europe is identified as the E1 standard. An important component of a digital transmission system is the repeater. Repeaters are placed at regular intervals along a transmission line in order to regenerate signals. A digital baseband line equalizer is invariably employed in the front end of repeaters such as those used in a T1 or E1 system. The equalizer filters and amplifies a signal which has been distorted during transmission over a length of cable.

The signal is a ternary digital signal transmitted at a rate of 1.544 Mbits/sec (megabits per second) in the T1 standard, and 2.04 Mbits/sec in the E1 standard. By ternary, it is meant that the signal has three logic levels: low, zero and high. Data is encoded using an alternate mark inversion (AMI) scheme in which a logical zero is transmitted as a zero voltage, and a logical one is transmitted as either a high or low voltage.

The equalizer used in the front end of these repeaters includes an automatic gain control (AGC) circuit which modifies the gain and frequency response of the equalizer to adjust for varying line conditions. It is intended for the AGC circuit to maintain a constant amplitude signal at the output of the equalizer. However, with conventional AGC circuits, the amplitude of the output signal tends to vary as a function of the data density of the signal. For example, if a data signal has a large number of zeros occurring one after the other, then it will appear to the conventional AGC circuit that the gain needs to be increased, even though a correct amplitude data stream is being received. Thus, the gain of the circuit tends to be dependent on the content or density of the data being received at the repeater.

What is needed is an equalizer that will produce a constant amplitude output signal independent of data density.

SUMMARY OF THE INVENTION

The invention is an automatic gain control (AGC) circuit for generating a control voltage for a digital baseband line equalizer. The control voltage controls the gain and frequency response (i.e., the equalization) of the equalizer. The control circuit includes a capacitor for storing a charge to produce the control voltage, a charging circuit for charging the capacitor and a discharging circuit for discharging the capacitor.

The charging circuit is configured to charge the capacitor if the amplitude of the ternary output signal of the equalizer exceeds a reference voltage. The discharging circuit is configured to discharge the capacitor only when the ternary output signal is at a non-zero level. That is, the capacitor is prevented from discharging when data is not present in the ternary output signal. This maintains a substantially constant gain during the period when no data is present in the output signal.

The charging circuit includes two comparators for monitoring the ternary output signal and for producing a trip signal when the amplitude (either positive or negative) of the ternary output signal exceeds either a positive or negative reference voltage. The trip signal controls a current source which provides a charge current to the capacitor. The capacitor is charged only when the amplitude of the ternary output signal exceeds one of the reference voltages.

The discharging circuit includes two comparators which slice the ternary output signal to convert the signal back to a clean ternary digital signal. A current source provides the discharge current to the capacitor only when data (i.e., a 1 or −1) is present in the ternary output signal. A flip flop in the discharging circuit further decreases the influence of the data density on the control voltage. The flip flop is synchronized with a clock signal reconstructed from the input signal to produce a uniform on-time to the discharge current source.

The resulting control circuit provides an accurate control voltage to the AGC circuit of the equalizer. The gain of the AGC will be relatively immune to noise and will be independent of data density.

The foregoing and other features and advantages of the invention will be apparent from the following more particular description of a preferred embodiment of the invention, as illustrated in the accompanying drawings.

DETAILED DESCRIPTION OF THE PREFERRED EMBODIMENT

The preferred embodiment of the invention is discussed with reference to the figures in which like reference numbers indicate like elements. Furthermore, the left most digit of each reference number indicates the number of the figure in which the number first appears. While specific part numbers and configurations are discussed, it should be understood that this is done for illustration purposes only. A person skilled in the art will recognize that other components and configurations may be used without departing from the spirit and scope of the invention.

Figure 1:
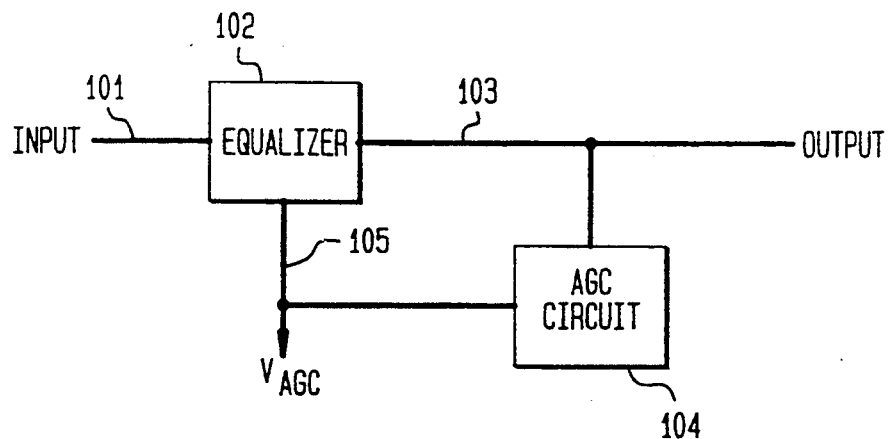
FIG. 1 is a block diagram illustrating an equalizer and AGC circuit.

FIG. 1 is a block diagram illustrating a typical digital baseband line equalizer such as that used in a T1 or E1 repeater. Equalizer 102 receives an input signal 101 and produces a ternary output signal 103. Input signal 101 is typically distorted by transmission over a relatively long telephone cable. Equalizer 102 equalizes the distorted signal to produce output signal 103. By "equalize," it is means to amplify and/or filter.

Varying line conditions require different equalization. For example, longer line lengths have increased low pass filtering effects on a digital signal. Thus, when a signal is received from a long line length, the equalizer must perform a greater amplification at the high frequencies. At shorter line lengths, the extent of high frequency attenuation is reduced and therefore high frequency accentuation by the equalizer may be reduced. As discussed below, the equalizer of the invention adjusts its gain and frequency response (i.e., location of poles and/or zeros) to varying line conditions.

An automatic gain control (AGC) circuit 104 controls the equalization of equalizer 102. AGC circuit 104 monitors the amplitude of output signal 103 and produces a control voltage $V_{AGC}$ as a function of the amplitude of output signal 103. Control voltage $V_{AGC}$ is then applied to a control input 105 of equalizer 102.

Equalizer 102 includes a plurality of amplifier stages. Control voltage $V_{AGC}$ is used to change the equalization (gain versus frequency characteristics) of one or more of the amplifier stages. This may be done in a number of ways which will be apparent to a person skilled in the relevant art. For illustration purposes, a single amplifier stage is discussed below. For example, in an inverting amplifier configuration, a parallel arrangement of a variable conductance element (e.g., a MOSFET) and a capacitor can be input to the summing junction of the amplifier. Both the DC gain and the frequency of a zero can be changed by varying the conductance of the variable conductance element as a function of control voltage $V_{AGC}$. In the illustrated embodiment, equalizer 102 will decrease its gain to produce a smaller output signal 103 in response to an increase in $V_{AGC}$.

Figure 2:
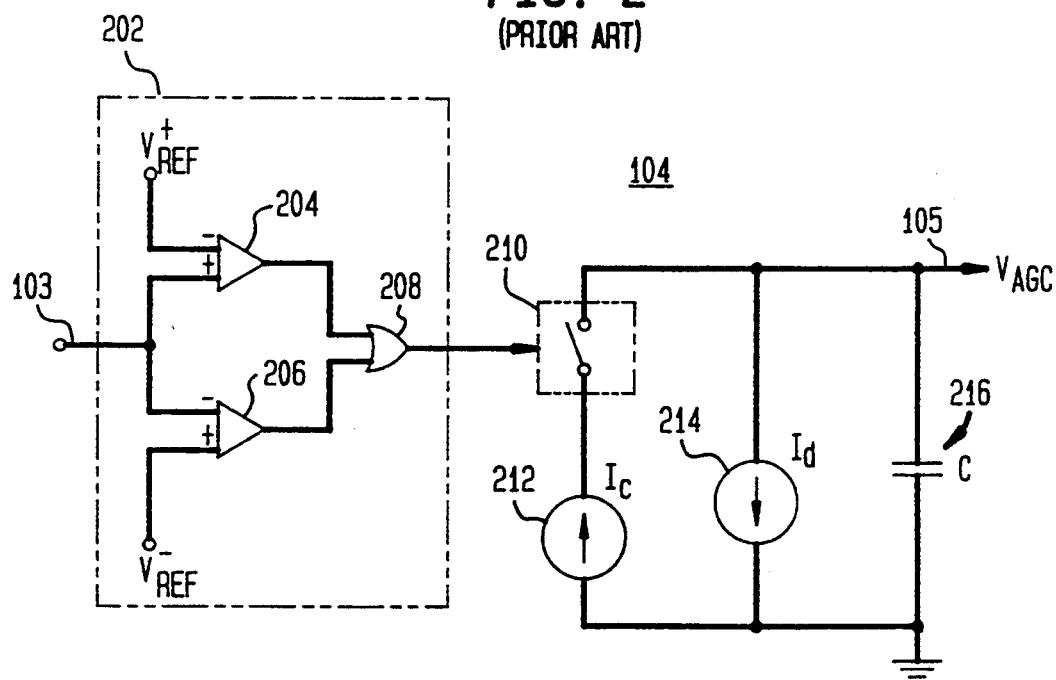
FIG. 2 is a schematic diagram illustrating a conventional AGC circuit.

FIG. 2 illustrates a conventional AGC circuit 104. AGC circuit 104 includes a comparator circuit 202, a switch 210, a charge current source 212, a discharge current source 214, and a capacitor 216. Comparator circuit 202 includes comparators 204,206 and an OR gate 204.

AGC circuit 104 operates as follows. Output signal 103 is compared to a positive reference voltage by comparator 204 and to a negative reference voltage by comparator 206. If output signal 103 exceeds the positive reference voltage, then comparator 204 will output a high signal. As discussed above, output signal 103 is a ternary digital signal which includes positive, negative and zero voltage levels.

Comparator 204 outputs a trip signal when the amplitude of output signal 103 exceeds a positive reference voltage. Similarly, comparator 206 outputs a trip signal when the amplitude of output signal 103 exceeds a negative reference voltage. That is, when output signal 103 has a larger negative amplitude than the negative reference signal, comparator 206 trips. OR gate 208 performs a logical OR of the signals from comparators 204,206. If either comparator 204 or comparator 206 outputs a trip signal, then OR gate 208 will output a signal which will cause switch 210 to close.

When switch 210 closes, charge current source 212 will provide a charge current $I_c$ to capacitor 216. Charging capacitor 216 will increase the amplitude of $V_{AGC}$. In this condition, comparator circuit 202 is informing equalizer 102 that output signal 103 is too large and that the equalizer should be adjusted to bring the amplitude of output signal 103 to within the desired range. The adjustment is not merely an adjustment of the DC gain. As discussed above, the frequency of a zero is also changed. Thus, equalizer 102 is adapting its equalization to a perceived change in line condition.

When the amplitude of output signal 103 is within the desired range, neither of comparators 204,206 will output a high signal. In this case, switch 210 will remain open, and charge current $I_c$ will not charge capacitor 216. As a result, $V_{AGC}$ will not increase.

Discharge current source 214 supplies a constant bleed or discharge current $I_d$ to capacitor 216 so that AGC circuit 104 will remain responsive to changes in the amplitude of output signal 103. Without a discharge mechanism, capacitor 216 would hold a charge and would not be responsive to subsequent increases in signal amplitude.

In a T1 or E1 repeater application, output signal 103 may, for example, have a zero level for 15 or 16 cycles in a row. In fact, output signal 103 may have a data density which yields a zero for as much as 90% of the time. With discharge current $I_d$ providing a continuous discharge of capacitor 216 and with charge current $I_c$ not turning on when zeros are present in output signal 103, $V_{AGC}$ will droop (i.e., slowly fall). In response to the droop, equalizer 102 will increase its equalization. Note that this increase occurs as a result of the data density (i.e., the number of zeros occurring in a row in output signal 103) rather than the amplitude of output signal 103. This is an undesirable effect. A proper functioning equalizer should yield a constant amplitude signal rather than one that varies as a function of the data contained therein.

It is possible to make AGC circuit 104 less sensitive to data density by reducing the amplitude of discharge current Ia produced by discharge current source 214. There are, however, two problems with this solution. First, it is difficult to make and accurately maintain very small currents in an integrated circuit. Second, if the discharge current $I_d$ is very small, any noise on output signal 103 will tend to cause a drop in gain. The reason for this effect is explained below.

The ratio of the charge current $I_c$ to the discharge current $I_d$ will determine what percentage of the time output signal 103 is above either the positive or negative reference voltage. If the ratio is very high (i.e., the charge current $I_c$ is much larger than the discharge current $I_d$), then output signal 103 will be above the positive or negative reference voltages only a small percentage of the time. If output signal 103 is a relatively clean sinusoidal signal, then the peak negative and positive voltages would be near the respective positive and negative reference voltage levels. With a large amount of noise present, however, the equalization of the equalizer will drop so that only the peak of output signal 103 with the superimposed noise would go above the reference level. Thus, while making discharge current $I_d$ very small reduces the equalization's dependency on data density, it increases the dependency on noise. It is desirable to have an equalization that is independent of both data density and noise.

Figure 3:
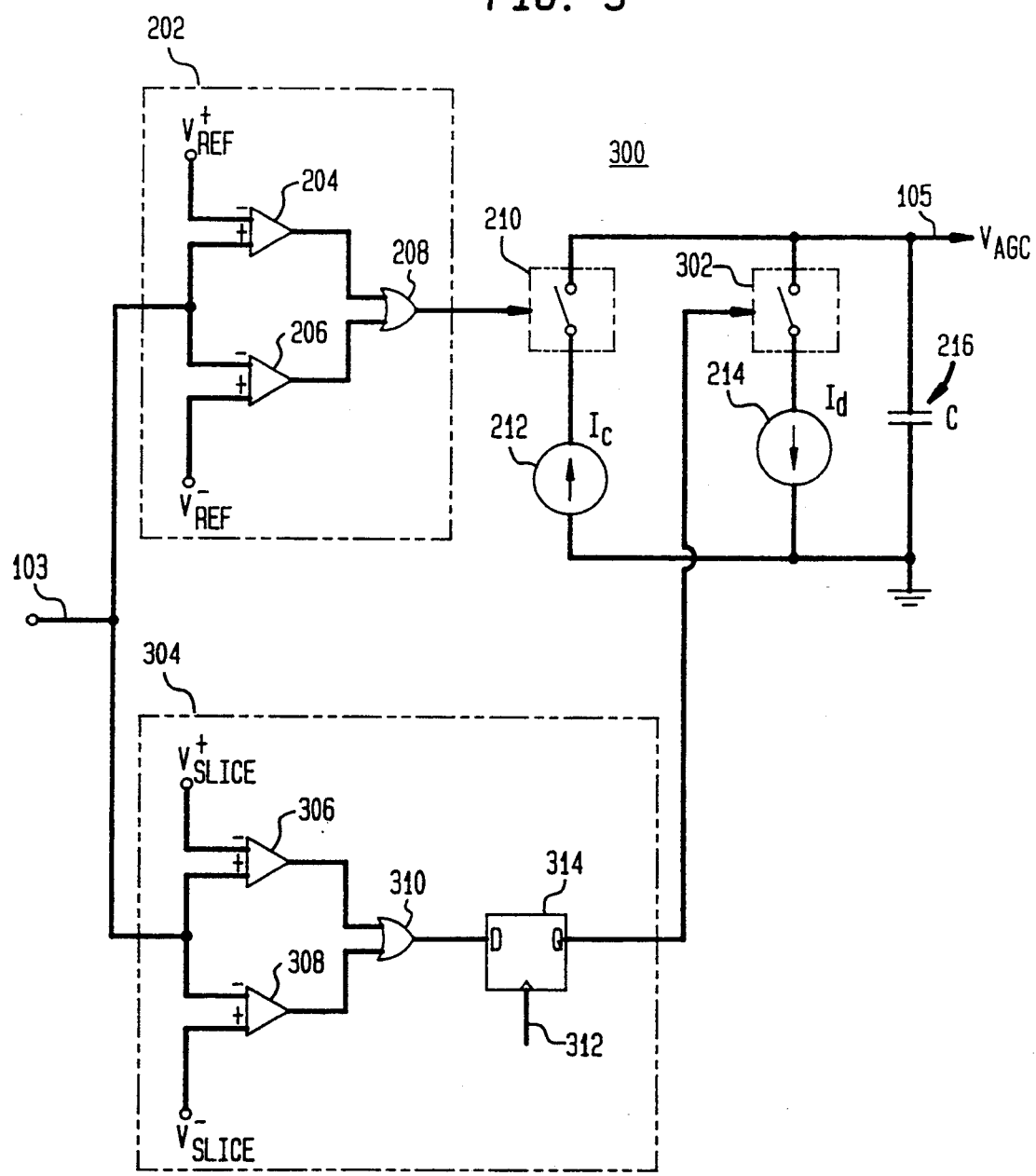
FIG. 3 is a schematic diagram illustrating the AGC circuit of the invention.

The present invention solves these problems by replacing AGC circuit 104 with AGC circuit 300 illustrated in FIG. 3. AGC circuit 300 is similar to AGC circuit 104. However, a switch 302 has been inserted in series with discharge current source 214. Switch 302 controls the application of discharge current $I_d$ to capacitor 216. Switch 302 is controlled by a comparator circuit 304.

Comparator circuit 304 is substantially identical to comparator circuit 202. Comparator circuit 304 includes comparators 306,308 and an OR gate 310. Additionally, comparator circuit 304 includes a D-type flip flop 314. Comparator 306 compares output signal 103 to a high or positive slice voltage. Comparator 308 compares output signal 103 to a low or negative slice voltage 308. If the amplitude of output signal 103 exceeds the positive slice voltage, then comparator 306 outputs a high signal. If the amplitude of output signal 103 exceeds (i.e., goes more negative than) the negative slice voltage, then comparator 308 outputs a high signal.

If the output of either comparator 306 or comparator 308 goes high, OR gate 310 will produce a high signal at the D input of flip flop 314. The Q output of flip flop 314 controls switch 302. The Q output will follow the D input signal as controlled by a clock signal 312 on the clock input of flip flop 314. Clock signal 312 is reconstructed from input signal 101 and is available in the repeater as would be apparent to a person skilled in the relevant art. When the Q output of flip flop 314 is high, switch 302 will close and allow discharge current $I_d$ from current source 214 to discharge capacitor 216.

The value of the positive slice voltage is selected to detect a logical high in output signal 103. Similarly, the negative slice voltage is selected so that comparator 308 will detect a logical low in output signal 103. Selecting the slice voltages in this manner will allow comparator circuit 304 to detect non-zero data in output signal 103. Thus, switch 302 is closed, and discharge current $I_d$ is applied to capacitor 216 only when non-zero data is present in output signal 103.

In implementing AGC circuit 300 in a repeater such as the T1 or E1, comparators 306,308 will already be present in the repeater. These devices are present in the slicing circuit which is used to reconstruct the digital signal.

In an alternate embodiment of the invention, flip flop 314 may be eliminated and the output of OR gate 310 used to control switch 302. However, this will increase the sensitivity of AGC circuit 300 to the data density of input signal 101. Flip flop 314 decreases the influence of the data density on control voltage $V_{AGC}$. Flip flop 314 is synchronized with clock signal 312 to produce a uniform on-time to discharge current source 214.

In AGC circuit 300, the ratio between the charge current $I_c$ and discharge current $I_d$ will determine the circuits sensitivity to data density or noise. A tradeoff is made between the two. In the preferred embodiment, the ratio is made relatively small (e.g., on the order of 2/1 or 3/1). The result produced by AGC circuit 300 is that the equalization of equalizer 102 is relatively immune to the effects of noise, and the data density of output signal 103 will not affect gain.

One potential problem remains in the circuit of equalizer 102 and AGC circuit 300. If the amplitude of input signal 101 suddenly drops to a very low level, AGC circuit 300 will not automatically increase the equalization. Normally, such a sudden drop should not occur, except possibly during startup of a newly installed repeater. However, it may be desirable to prepare for such a contingency. This can be accomplished through the addition of a timeout circuit. Such a circuit could, for example, automatically increase the equalization of equalizer 102 if a certain predetermined number of zeros (e.g., 20) are received one after the other.

In the preferred embodiment of the invention, comparator circuits 202 and 304 are implemented as described above. In an alternate embodiment, however, comparator circuit 202 and/or comparator circuit 304 may be implemented with a single comparator. Because the ternary data signal is substantially symmetrical about a zero volt reference it is not necessary to detect the both the positive and negative excursions of the signal. For example, only the positive magnitudes may be monitored using comparator 204 to control charge current source 212 and using comparator 306 (with flip flop 314, if desired) to control discharge current source 214.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. An automatic gain control circuit for generating a control voltage to control the equalization of a digital line equalizer having a ternary output signal, comprising:
   storage means for storing a charge to produce the control voltage;
   charge means for providing a first current to said storage means if the amplitude of the ternary output signal of the digital baseband line equalizer exceeds a reference voltage; and
   discharge means for providing a second current to said storage means only when the ternary output signal is at a non-zero level, wherein said second current has a polarity opposite that of said first current.

2. The automatic gain control circuit of claim 1, wherein said storage means comprises a capacitor.

3. The automatic gain control circuit of claim 2, wherein said charge means comprises:
   first comparator means for monitoring the ternary output signal and for producing a trip signal when the amplitude of the ternary output signal exceeds said reference voltage; and
   first current source means for providing said first current to said capacitor in response to said trip signal.

4. The automatic gain control circuit of claim 3, wherein said first comparator means comprises:
   a first comparator configured to compare the ternary output signal to a high reference voltage and to produce a high trip signal when the amplitude of the ternary output signal exceeds said high reference voltage;
   a second comparator configured to compare the ternary output signal to a low reference voltage and to produce a low trip signal when the amplitude of the ternary output signal exceeds said low reference voltage; and
   an OR gate coupled to said first and second comparators and configured to output said trip signal in response to one of said high trip signal and said low trip signal.

5. The automatic gain control circuit of claim 4, wherein said first current source means comprises:
   a first current source configured to produce said first current; and
   a first switch connected in series with said first current source to selectively provide said first current to said capacitor in response to said trip signal.

6. The automatic gain control circuit of claim 5, wherein said discharge means comprises:
   second comparator means for monitoring the ternary output signal and for producing a data present signal when the amplitude of the ternary output signal exceeds a data slice voltage; and
   second current source means for providing said second current to said capacitor in response to said data present signal.

7. The automatic gain control circuit of claim 6, wherein said second comparator means comprises:
   a third comparator configured to compare said ternary output signal to a high slice voltage and to produce a data high present signal when the amplitude of the ternary output signal exceeds said high slice voltage;

a fourth comparator configured to compare the ternary output signal to a low slice voltage and to produce a data low signal when the amplitude of the ternary output signal exceeds said low slice voltage; and an OR gate coupled to said third and fourth comparators and configured to output said data present signal in response to one of said data high present signal and said data low present signal.

8. The automatic gain control circuit of claim 7, wherein said second current source means comprises:

a second current source configured to produce said second current; and second switch connected in series with said second current source to selectively provide said second current to said capacitor in response to said data present signal.

9. An apparatus for producing a control voltage for a digital baseband line equalizer having a ternary output signal, comprising:

a capacitor configured to store a charge to produce the control voltage;

first comparator means for monitoring the ternary output signal and for producing a trip signal when the amplitude of the ternary output signal exceeds a reference voltage;

charge means for providing a first current to said capacitor in response to said trip signal;

second comparator means for monitoring the ternary output signal and for producing a data present signal when the amplitude of the ternary output signal exceeds a data slice voltage; and discharge means for providing a second current to said capacitor in response to said data present signal, wherein said second current has a polarity opposite that of said first current.

10. The apparatus of claim 9, wherein said first comparator means comprises:

a first comparator configured to compare the ternary output signal to a high reference voltage and to produce a high trip signal when the amplitude of the ternary output signal exceeds said high reference voltage;

a second comparator configured to compare the ternary output signal to a low reference voltage and to produce a low trip signal when the amplitude of the ternary output signal exceeds said low reference voltage; and an OR gate coupled to said first and second comparators and configured to output said trip signal in response to one of said high trip signal and said low trip signal.

11. The apparatus of claim 10, wherein said charge means comprises:

a first current source configured to produce said first current; and a first switch means connected in series with said first current source to selectively provide said first current to said capacitor in response to said trip signal.

12. The apparatus of claim 11, wherein said second comparator means comprises:

a third comparator configured to compare the ternary output signal to a high slice voltage and to produce a data high present signal when the amplitude of the ternary output signal exceeds said high slice voltage;

a fourth comparator configured to compare the ternary output signal to a low slice voltage and to produce a data low present signal when the amplitude of the ternary output signal exceeds said low slice voltage; and an OR gate coupled to said third and fourth comparators and configured to output said data present signal in response to one of said data high present signal and said data low present signal.

13. The apparatus of claim 12, wherein said discharge means comprises:

a second current source configured to produce said second current; and second switch means connected in series with said second current source to selectively provide said second current to said capacitor in response to said data present signal.

* * * * *